Dec. 6, 1949          H. E. MALONE          2,490,073
COMBINATION FAN AND LIMIT SWITCH MECHANISM
Filed Dec. 11, 1946          2 Sheets-Sheet 1
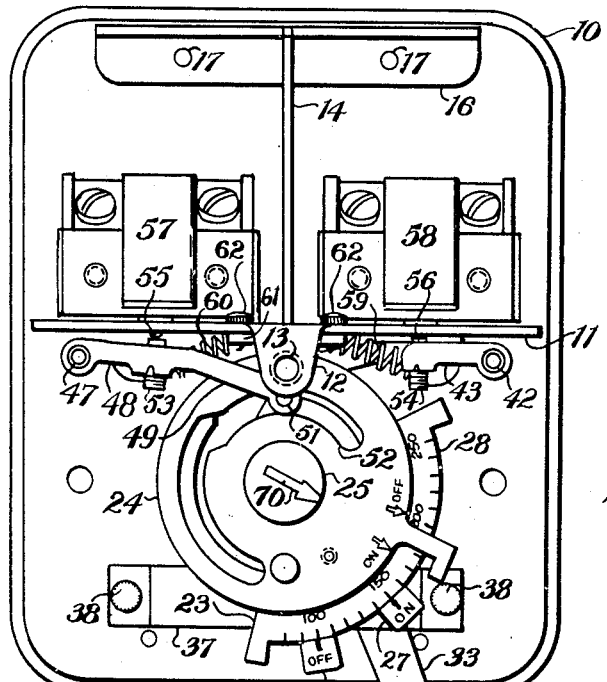
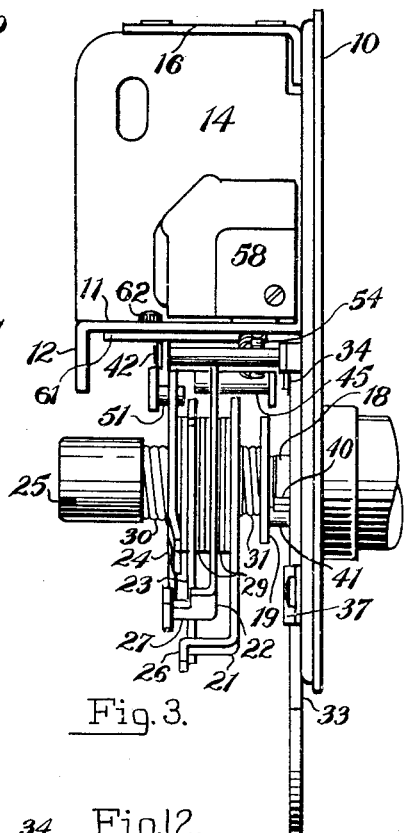
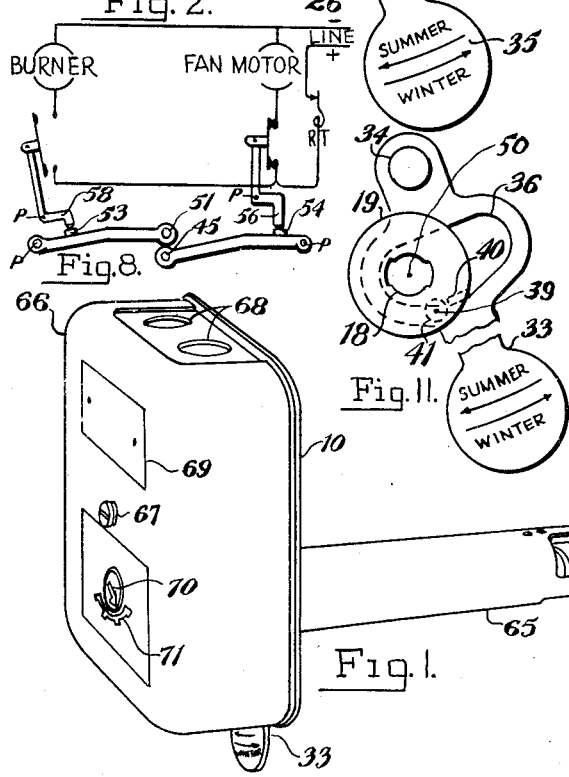
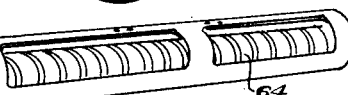
INVENTOR.
Homer E. Malone
BY
Kimball & Wyman Dec. 6, 1949        H. E. MALONE        2,490,073

COMBINATION FAN AND LIMIT SWITCH MECHANISM

Filed Dec. 11, 1946        2 Sheets-Sheet 2

INVENTOR.
Homer E. Malone

BY Kimball S. Wyman

Patented Dec. 6, 1949

2,490,073

UNITED STATES PATENT OFFICE 2,490,073

COMBINATION FAN AND LIMIT SWITCH MECHANISM

Homer E. Malone, Milwaukee, Wis., assignor to Perfex Corporation, Milwaukee, Wis., a corporation of Wisconsin Application December 11, 1946, Serial No. 715,399

14 Claims. (Cl. 200—138)

This invention relates in general to control devices, but more particularly to automatic control devices for use in air conditioning systems, and the broad object of the invention is to provide an improved control device embodying electric switching mechanism responsive to condition changes.

In air conditioning systems it is customary to provide a heating plant or furnace for warming the air in a space to be heated, and in some cases to provide a means for circulating the heated air. In order to control the operation of the heating plant within certain limits and to maintain the space at a comfortable temperature, a room thermostat is usually provided to regulate the generation of heat from the furnace. To further insure uniformity of temperature in the space being heated, and to safeguard against excessive temperatures in the heating plant, it has been customary to supplement the room thermostat with a control means commonly called a limit control, which is arranged to respond to the temperature of the furnace and may be located upon a warm air duct or the bonnet of the furnace. It is likewise desirable that the heated air be forced or circulated to the space to be heated, and for this purpose an additional control device is located so as to be responsive to the furnace temperature to prevent the circulation of the air until it reaches a predetermined temperature.

The present invention is concerned with an automatic control device which is arranged to respond to temperature changes of an air conditioning system, and one of the principal objects is to provide an improved control device arranged to be manually actuated to condition the air circulating means in the summer months, providing a cooling effect.

A further object of this invention is to provide a control device wherein changeover from winter operation of the heat generating means and air circulating means to summer operation of the air circulating means only is accomplished by a novel arrangement of parts in the control device giving positive trouble-free action of the changeover means.

A further object of this invention is to provide a control device wherein the change-over from winter to summer operation is accomplished by means of a pivoted member manually movable from a winter to a summer position, and by means coacting with said member to provide a resilient force yieldingly resisting such movement, the same resilient force acting to hold the pivoted member positively and firmly in the summer position.

An additional object is to provide a control device having a minimum number of parts arranged in a compact manner whereby ease of adjustment, accessibility, and assembly are more readily attained.

With the foregoing and other objects in view, the invention may be considered as comprising combinations of parts and/or elements constructed and correlated as hereinafter more fully set forth in the detailed description and appended claims, reference being had to the accompanying drawings illustrating but one embodiment of the invention, in which Fig. 1 is a perspective view of an enclosed switching mechanism embodying the invention;

Fig. 2 is a front view of the mechanism shown in Fig. 1 with the cover removed;

Fig. 3 is a side view of the mechanism shown in Fig. 1 with the thermal element broken away;

Fig. 8 is a schematic circuit arrangement showing the control device conditioned for summer operation;

Fig. 11 is a view of the parts used in selectively conditioning the switching mechanism for either summer or winter operation, the parts being shown positioned for winter operation;

Fig. 12 is a view illustrating the coaction between the parts shown in Fig. 10 when moved to a position approximately midway between their summer and winter positions; and Fig. 13 is a view of the parts shown in Figs. 10 and 11 positioned for summer operation.

Figure 4:
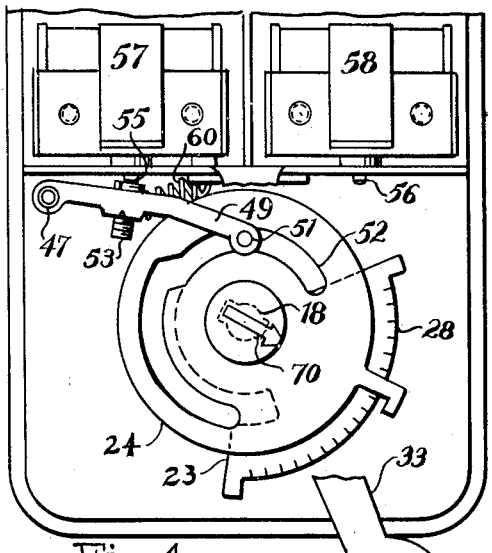
Fig. 4 is a partial view of the mechanism similar to Fig. 1 with parts omitted and broken away to better show the construction and manner of actuating one of the switch operating levers.

Referring now to Figs. 1, 2, and 3, a rear base plate 10 has rigidly secured thereto a bracket 11 with a depending ear 12 having a threaded hole 13 therein. Rigidly secured by any suitable means to the bracket 11 is a longitudinal dividing wall 14, the upper edge of which is fastened to a bracket 16 which is rigidly secured to the base plate 10 by rivets 17, welding, or other suitable means.

A shaft 18 extends through the base plate 10 and has mounted thereon a disc 19, cam plates 21, 22, 23, and 24, an indicating knob 25, cam plates 21 and 22 having indicating tabs 26 and 27 extending therefrom respectively, which cooperate with a temperature scale 28 on cam plate 23. Cam plate 24 has "On" and "Off" markings which also cooperate with scale 28. Fiber washers 29 separate cam plates 21, 22, 23, and 24 and compression springs 30 and 31 are interposed between the knob 25 and cam plate 24 and between cam plate 21 and disc 19 respectively. A lever 33 is swingably mounted on a pivot pin 34 which extends from the front face of the base plate 10 and has markings 35 thereon designating a summer position (extreme left hand position) and a winter position (extreme right hand position). The shaft 18 extends through a generally horizontal slot 36 in the lever 33 (Fig. 11). A bracket 37 is secured to base plate 10 by screws 38 and extends over the lever 33 in confining and guiding relation thereto. A rectangular cam member 40 is struck from the body of lever 33 and extends outwardly therefrom for engagement with a cylindrical follower member 41 mounted on disc 19.

Figure 6:
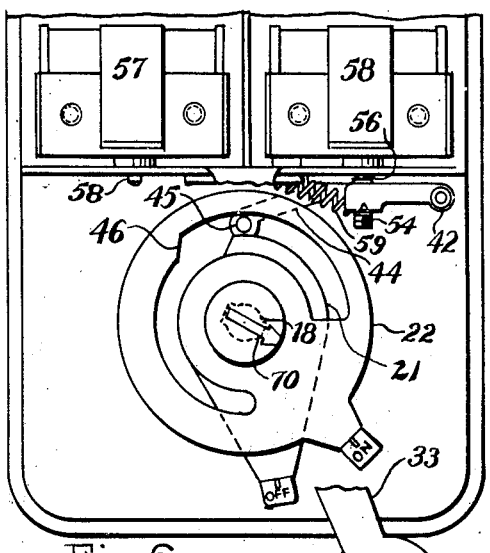
Fig. 6 is a view similar to Fig. 4 showing the construction and manner of actuating the other switch operating lever.
Figure 5:
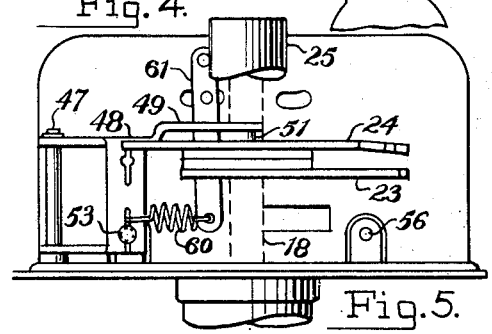
Fig. 5 is a bottom view of the mechanism shown in Fig. 4.
Figure 7:
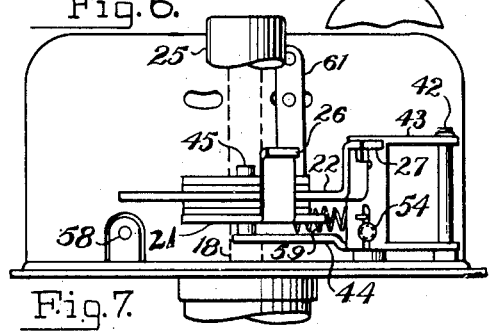
Fig. 7 is a bottom view of the mechanism shown in Fig. 6.
Figure 9:
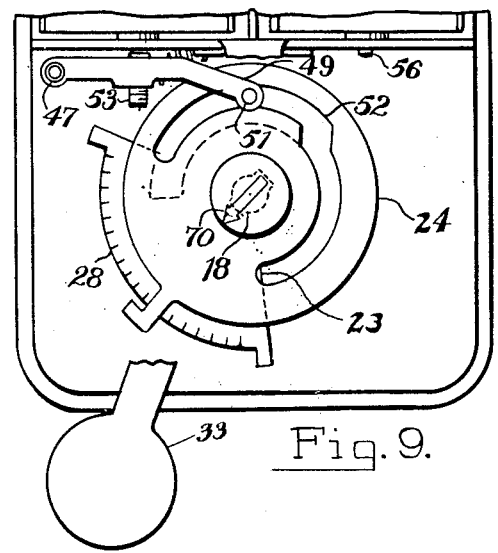
Fig. 9 is a view of the mechanism shown in Fig. 4 with the switching mechanism conditioned for summer operation.
Figure 10:
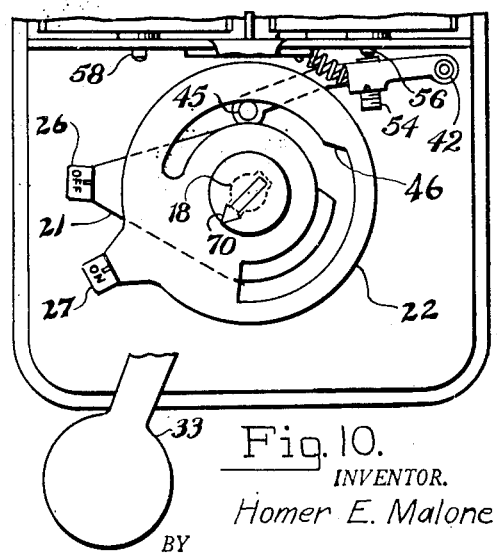
Fig. 10 is a view of the mechanism shown in Fig. 6 with the switching mechanism conditioned for summer operation.

A pin 42 is rigidly fastened to the base plate 10 and serves as a pivotal mounting for a U-shaped bracket 43. The rear leg 44 (Fig. 7) of bracket 43 is elongated and carries a follower pin 45 extending outwardly therefrom through a cam slot 46 in cam plate 22 (Fig. 6). A pin 47 pivotally mounts a bracket 48 identical with bracket 43 except that the front leg 49 rather than the rear leg is elongated. A follower pin 51 extends rearwardly from the end of leg 49 through a cam slot 52 in cam plate 24. Thrust members 53 and 54 are screw-threaded through the cross pieces of brackets 48 and 43 respectively and abut the thrust pins 55 and 56 of the enclosed switches 57 and 58 which are mounted by any suitable means on the base plate 10. Switches 57 and 58 are of the well known type wherein a small inward movement of the thrust pin causes the switch contacts to open with a snap action. Tension springs 59 and 60 extend from the cross pieces of brackets 43 and 48 respectively and each is secured to the adjacent one of a pair of plates 61 which are fastened to bracket 11 by means of screws 62.

Shaft 18 extends rearwardly through base plate 10 and is fastened to a helical bimetal element 64 (Fig. 1). A cylindrical housing 65 is secured to the rear face of the base plate 10 and surrounds shaft 18 and bimetal element 64. A front cover 66 is secured in place by the mounting screw 67 which fits into the threaded opening 13 in the ear 12 on bracket 11. The bracket 16 has openings 68 therein which allow switches 57 and 58 to be reached conveniently for wiring. An indented portion 69 in cover 66 may be utilized for a name plate or other identifying markings. An opening in the case permits an arrow 70 imprinted on the end of the knob 25 to be visible, the arrow 70 and accompanying temperature scale 71, imprinted on the cover, providing a means for determining the temperature to which the bimetal element 64 is subjected. The lower portion of lever 33 extends through a slot in the cover 66 and is thus readily accessible for manual operation.

For a detailed description of the general construction, cam plate setting, and operation, see the patent to Malone 2,315,533, issued April 6, 1943, which discloses a control device with switching and cam mechanism in general identical with that herein described, with the exception that the controlling switches are not of the totally enclosed type. Briefly, however, operation of the control device is as follows: The cam plates 21 and 22 are set for the desired temperature values with reference to temperature scale 28. As the temperature of the furnace increases, bimetal 64, which extends into the bonnet or warm air duct of the furnace, rotates shaft 18 and cam plates 21, 22, 23, and 24, which actuate the switches 57 and 58 controlling the heat generating means and air circulating means respectively.

During the summer months it is often desirable to adjust the room thermostat to closed position and to operate the air circulating means while maintaining the heat generating means inoperative. This requires that a convenient, positive means be provided for holding the switch controlling the air circulating means closed and the switch for controlling the heat generating means open. The lever 33, cam member 40, and follower member 41 cooperate with the disc 19 to provide an improved mechanism for so conditioning the control mechanism for summer operation. Referring now to Figs. 9, 10, 11, 12, and 13, the slot 36 permits lever 33 to move about its pivot to either side of shaft 18. In Fig. 11, lever 33 is in its extreme right hand or winter position and cam member 40 is not touching follower member 41. The resilient bimetal element 64 is therefore free to rotate shaft 18, disc 19, and cam plates 21, 22, 23, and 24 in clockwise direction upon an increase in temperature. This position of lever 33 permits normal winter operation of the control device.

If lever 33 is manually moved in clockwise direction about its pivot 34, from the position shown in Fig. 11 to that shown in Fig. 12, cam member 40 engages follower member 41 initially rotating it in a counter-clockwise direction about its own axis (designated 39 in Figs. 11, 12, and 13), and also thereby rotating disc 19, upon which follower member 41 is mounted, in clockwise direction about its center, designated 50 in Figs. 11, 12, and 13. During this initial counter-clockwise rotation of follower member 41 about its own axis 39, since disc 19 and member 33 move about different centers, cam member 40 first moves upward relative to the axis 39 of follower 41. Further manual movement of lever 33 in clockwise direction causes cam member 40 to move downwardly relative to the axis of rotation 39 of follower 41, thereby reversing the direction of rotation of follower 41 (see Fig. 12). Since the disc 19 is rigidly mounted on the shaft 18, clockwise rotation of disc 19 causes shaft 18 and cam plates 21, 22, 23 and 24 to rotate in a clockwise direction against the resilient force of bimetal 64, such resilient force acting on cam member 40 at its point of contact 75 with follower member 41 and in a direction tending to move lever 33 in a counter-clockwise direction. Further movement of lever 33 to its extreme left hand position (Fig. 13) causes cam member 40 to continue to move follower member 41 and thereby rotate disc 19 in a clockwise direction about its center, 50, follower member 41 being rotated by member 40 in a clockwise direction about its own axis 39, and thereby moved across the narrow edge of cam member 40 and then across the top surface thereof. Since, as previously pointed out, clockwise rotation of disc 19 tensions bimetal 64, a resilient force is thereby, in effect, stored therein. Referring to Fig. 12, it may be that this resilient force, acting on cam member 40 at its point of contact 75 with follower 41, has a moment about the pivot 34 opposing clockwise movement of lever 33, the lever arm of such moment being the distance from the follower member's point of contact 75 with the cam member 40 to the pivot 34. Continued clockwise movement of lever 33 causes follower member 41 to move across the top of cam member 40 whereupon the resilient force stored in bimetal element 64 is directed generally along the longitudinal axis of the lever 33. As the point of contact 75 approaches the longitudinal axis of lever 33 the small component of the resilient force of element 64 resisting clockwise rotation of lever 33 decreases and becomes zero when point of contact 75 is in line with the pivot 34 along the longitudinal axis of lever 33. This decreasing component of force tending to return lever 33 to its extreme right hand position, however, is overcome by the greater component directed parallel to the longitudinal axis of lever 33 which creates a frictional force at pivot 34 resisting movement of lever 33 in either direction. Further movement of the point of contact 75 to the right hand side of the longitudinal axis of lever 33 (Fig. 13) creates a moment of the resilient force of element 64, whose lever arm is the distance between the point of contact 75 and the longitudinal axis of lever 33, which tends to aid, rather than resist, movement of lever 33 in clockwise direction. Thus manual movement of lever 33 in clockwise direction will be resisted by the resilient force stored in bimetal element 64 until the point of contact 75 reaches the top surface of cam member 40, whereupon the increased frictional force at pivot 34 will hold lever 33 in its new position. Further manual movement of lever 33 in clockwise direction (Fig. 13) causes the resilient force of element 64 to more positively hold lever 33 in its extreme left hand or summer position. With the lever 33 in its extreme left hand position, cam plates 21, 22, 23, and 24 have been rotated to the position shown in Figs. 9 and 10 and switch 57 controlling the heat generating means is open and the switch 58 controlling the air circulating means is closed, permitting the air circulating means to operate independently of the heat generating means (see Fig. 8).

In addition, it should be apparent that certain of the features of construction and certain of the combination of parts herein disclosed are applicable to control devices other than the type above mentioned and that apparatus embodying the invention may vary considerably from that herein shown and described for purposes of illustration. It should therefore be understood that it is not intended to limit the invention to the exact construction and/or combinations of elements shown and described herein, as various modifications within the scope of the appended claims may occur to persons skilled in the art.

What is claimed is:

1. In a control device, an angularly movable member, control means actuated from a first position to a second position by an angular movement of said member, condition responsive means including a tensionable resilient part for angularly moving said member, manual means for angularly moving said member, said manual means comprising a cam movable in an arcuate path of relatively large radius, and a follower movable in an arcuate path of relatively small radius and coacting with said cam and said member to impart an angular movement to said member sufficient to actuate said control means from said first position to said second position upon a relatively short arcuate movement of said cam.

2. In a control device including a rotatably mounted control-actuating member, means including a tensionable resilient part operatively connected with said member and turnably biasing same to a predetermined position, a selector member mounted for pivotal movement about an axis radially spaced from the axis of rotation of said control-actuating member, and being manually movable from a first position to a second position, a cam follower rotatably mounted on said control-actuating member in radially spaced relation with respect to its said axis, and a generally flat cam member carried by said selector member and coacting with said follower to engage a side portion of said follower and then move relative thereto first in one direction and then in the opposite direction as said selector member moves from said first position to said second position.

3. In a control device including a rotatably mounted control-actuating member, means including a tensionable resilient part operatively connected with said member and turnably biasing same to a predetermined position, a selector member mounted for pivotal movement about an axis radially spaced from the axis of rotation of said control-actuating member, and being manually movable from a first position to a second position, a cam follower rotatably mounted on said control-actuating member in radially spaced relation with respect to its said axis, and a cam member carried by said selector member and coacting with said follower to edge-engage a side portion of said follower and then move relative thereto first in one direction and then in the opposite direction as said selector member moves from said first position to said second position.

4. In a control device including a rotatably mounted control-actuating member, means including a tensionable resilient part operatively connected with said member and turnably biasing same to a predetermined position, a selector member mounted for pivotal movement about an axis radially spaced from the axis of rotation of said control-actuating member, and being manually movable from a first position to a second position, a cam follower rotatably mounted on said control-actuating member in radially spaced relation with respect to its said axis, and a cam member carried by said selector member and coacting with said follower to engage a side portion of said follower and then move relative thereto first in one direction and then in the opposite direction and finally to a position substantially directly beneath said follower as said selector member moves from said first position to said second position.

5. In a control device including a rotatably mounted control-actuating member, means including a tensionable resilient part operatively connected with said member and turnably biasing same to a predetermined position, a selector member mounted for pivotal movement about an axis radially spaced from the axis of rotation of said control-actuating member, and being manually movable from a first position to a second position, a cam follower rotatably mounted on said control-actuating member in radially spaced relation with respect to its said axis, and a cam member carried by said selector member and coacting with said follower to engage a side portion of said follower and then move relative thereto first in one direction and then in the opposite direction to a final position substantially directly beneath and engaging said follower as said selector moves from said first position to said second position.

6. In a control device, a condition responsive means having resilient characteristic opposed to manual distortion, a control instrument in position to be actuated by said means, a member provided with a follower to move with said responsive means, and a manual member provided with a portion mounted to move in a path of movement against said follower to force movement thereof against the resilience of the condition responsive means, said path of movement of said portion retreating to provide a dwell for said follower.

7. In a control device, a rotatable member having a projection extending therefrom, control means actuated upon rotation of said member, resilient condition responsive means operatively connected with said member for rotation thereof upon a change in said condition, moveable means for rotating said member to actuate said control means in opposition to the force exerted by said resilient condition responsive means, said moveable means being moveable from a first position to a second position and comprising a cam engageable with said projection and moveable in an arcuate path having a radius greater than the radius of movement of said projection, said cam moving relative to said projection while remaining in engagement therewith during movement of said moveable means from said first position to said second position, whereby upon initial movement of said moveable means from said first position toward said second position the force exerted by said resilient means is applied in such a direction as to oppose such movement, and upon final movement of said moveable means into said second position, the force exerted by said resilient means is applied in such a direction as to aid such final movement.

8. In a control device, a rotatable member having a projection extending therefrom, control means actuated upon rotation of said member, resilient means operatively connected with said member for rotation thereof, moveable means for rotating said member to actuate said control means in opposition to the force exerted by said resilient means, said moveable means being moveable from a first position to a second position and comprising a cam engageable with said projection and moveable in an arcuate path having a radius greater than the radius of movement of said projection, said cam moving relative to said projection while remaining in engagement therewith during movement of said moveable means from said first position to said second position, whereby upon initial movement of said moveable means from said first position toward said second position the force exerted by said resilient means is applied in such a direction as to oppose such movement, and upon final movement of said moveable means into said second position, the force exerted by said resilient means is applied in such a direction as to aid such final movement.

9. In a control device, a rotatable member having a projection extending therefrom, biasing means operatively connected with said member, manually moveable means for rotating said member in opposition to the biasing force exerted by said biasing means, said manually moveable means being moveable from a first position to a second position and including a cam engageable with said projection and moveable in an arcuate path having a radius greater than the radius of movement of said projection, said cam moving relative to said projection while remaining in engagement therewith during movement of said manually moveable means from said first position to said second position whereby upon initial manual movement of said moveable means from said first position toward said second position the biasing force exerted by said biasing means is applied in such a direction as to oppose such movement, and upon final movement of said moveable means into said second position, the biasing means is applied in such a direction as to aid such final movement.

10. In a control device, a rotatable member having a projection extending therefrom, control means actuated upon rotation of said member, resilient condition responsive means operatively connected with said member for rotation thereof upon a change in said condition, moveable means for rotating said member to actuate said control means in opposition to the force exerted by said resilient condition responsive means, said moveable means being moveable from a first position to a second position and comprising a pivotally moveable lever mounted adjacent said rotatable member, a cam carried by said lever for engagement with and movement relative to said projection upon movement of said moveable means from said first position to said second position, whereby the force exerted by said resilient means opposes movement of said moveable means from said first position toward said second position and retains said moveable means in said second position once the same has been reached.

11. In a control device, a rotatable member carrying a projection thereon, control means actuated upon rotation of said member, resilient means operatively connected with said member for rotation thereof upon a change in said condition, manually moveable means for rotating said member to actuate said control means in opposition to the force exerted by said resilient condition responsive means, said moveable means being manually moveable from a first position to a second position and comprising a pivotally moveable lever mounted adjacent said rotatable member, a cam carried by said lever for engagement with and movement relative to said projection upon manual movement of said moveable means from said first position to said second position, whereby the force exerted by said resilient means opposes manual movement of said moveable means from said first position toward said second position and retains said moveable means in said second position once the same has been reached.

12. In a control device including a rotatably mounted control-actuating member, means including a tensionable resilient part operatively connected with said member and biasing said member to a predetermined position, means for rotating said control-actuating member against the biasing force of said resilient part, said means comprising a selector member pivotally mounted adjacent said control-actuating member and moveable from a first position to a second position, a cam follower rotatably mounted on said control-actuating member, a cam carried by said selector member having rolling frictional engagement with said cam follower as said selector member is moved from said first position to said second position whereby a moment of the biasing force of said resilient part opposes movement of said selector member from said first position toward said second position and a movement of said biasing force holds said selector member in said second position once the same has been reached.

13. In a control device including a rotatably mounted control-actuating member, means including a resilient heat responsive part operatively connected with said member and biasing said member to a predetermined position, means for manually rotating said control-actuating member against the resilient force exerted by said heat responsive part, said means comprising a selector member pivotally mounted adjacent said control-actuating member and manually moveable from a first position to a second position, a cam follower rotatably mounted on said control-actuating member, a cam rectangular in cross-section carried by said selector and extending generally at a right angle from the plane of said selector member, said cam having rolling frictional engagement with said cam follower as said selector member is manually moved from said first position to said second position whereby the force stored in said heat responsive part acts to oppose manual movement of said selector member from said first position toward said second position and acts to retain said selector member in said second position once the same has been reached.

14. In a control device including a rotatably mounted control-actuating member, means including a resilient heat responsive part operatively connected with said member and biasing said member to a predetermined position, means for manually rotating said control-actuating member against the resilient force exerted by said heat responsive part, said means comprising a selector member pivotally mounted adjacent said control-actuating member and manually moveable from a first position to a second position, a cam follower rotatably mounted on said control-actuating member, a cam rectangular in cross-section carried by said selector and extending generally at a right angle from the plane of said selector member, said cam having rolling frictional engagement with said cam follower, the point of engagement of said cam and said cam follower moving from one side of the pivot point of said selector member to the opposite side thereof as said selector member is manually moved from said first to said second position.

HOMER E. MALONE.

REFERENCES CITED

The following references are of record in the file of this patent:

UNITED STATES PATENTS

| Number | Name | Date |
| --- | --- | --- |
| 1,970,987 | Taylor | Aug. 21, 1934 |
| 2,308,434 | Shaw | Jan. 12, 1943 |
| 2,312,349 | Malone | Mar. 2, 1943 |
| 2,315,533 | Malone | Apr. 6, 1943 |